(12) United States Patent  (10) Patent No.: US 7,514,804 B2
Wang (45) Date of Patent: Apr. 7, 2009

(54) ENERGY HARVESTING TECHNIQUE TO SUPPORT REMOTE WIRELESS MEMS RF SENSORS

(75) Inventor: Sheng T. Wang, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/550,108

(22) Filed: Oct. 17, 2006

(65) Prior Publication Data

US 2008/0204005 A1   Aug. 28, 2008

(51) Int. Cl.
    H02P 9/04 (2006.01)
(52) U.S. Cl. ............... 290/1 R; 290/1 A; 324/249; 310/26
(58) Field of Classification Search .......... 290/1 R, 290/1 A, 6, 45; 324/249, 244; 310/26, 328
    See application file for complete search history.

(56) References Cited

U.S. PATENT DOCUMENTS

| | | | | |
|---|---|---|---|---|
| 4,448,059 A | * | 5/1984 | Kondo et al. ............... 73/35.09 |
| 5,023,526 A | * | 6/1991 | Kuwabara et al. ........... 318/116 |
| 5,554,922 A | * | 9/1996 | Kunkel .......................... 322/3 |
| 6,984,902 B1 | * | 1/2006 | Huang et al. ................... 310/26 |
| 7,023,206 B2 | * | 4/2006 | Viehland et al. ............. 324/249 |
| 7,161,254 B1 | * | 1/2007 | Janky et al. ................. 290/1 R |
| 7,199,480 B2 | * | 4/2007 | Fripp et al. ................. 290/1 R |
| 7,208,845 B2 | * | 4/2007 | Masters et al. .............. 290/1 R |
| 7,453,163 B2 | * | 11/2008 | Roberts et al. .............. 290/1 R |

* cited by examiner

*Primary Examiner*—Nicholas Ponomarenko
(74) *Attorney, Agent, or Firm*—Bracewell & Giuliani LLP (57) ABSTRACT

A method of harvesting vibrational energy is provided. This method involves generating a high magnetic flux density field within a current induction conductor such as an induction coil. The high magnetic flux density field is generated between two same pole magnets. The high magnetic flux density field may be displaced relative to the current induction conductor with vibrational energy. These displacements then cause the current induction conductor to be energized. The two same pole magnets are mounted between piezoelectric transducer (PZT) materials. These PZT materials generate an electric potential when the PZT materials are subject to the mechanical stresses of the vibrational energy. The electrical energy translated from the vibrational energy through both the energized current induction conductor and stress PZT materials may then be used to power a power circuitry or be stored for later use.

23 Claims, 7 Drawing Sheets

Prior Art

ENERGY HARVESTING TECHNIQUE TO SUPPORT REMOTE WIRELESS MEMS RF SENSORS

TECHNICAL FIELD OF THE INVENTION

The present invention relates generally to remote sensors, and more particularly, to the powering of remote sensors.

BACKGROUND OF THE INVENTION

In building complex structures such as aircraft, buildings or ships a need arises to model physical conditions on the structure. Often this is accomplished using scale models of the structure in environmental chambers such as wind tunnels or wave tanks. This enables an understanding of the expected performance or design flaws of the structure prior to actually building the structure itself. For example, physical conditions such as pressure can be measured with transducers placed on the various surfaces (wings, tail, nose etc.) of a wind tunnel model. The data measured by the transducers can then be recorded and analyzed.

Transducers are typically installed by drilling holes and passages in the model for wires that run to the transducers located in or on the model, or air tubes that run to remotely located transducers. The problem arises in that placing transducers on the model in this manner makes the model very expensive to build and the number, location and position of the transducers limited. Therefore the amount of data available becomes limited.

An additional problem arises when testing actual conditions on the full scale structures. In flight testing of an airplane, one may want to install sensors on the aircraft in order to measure pressure on the leading edges, the wing and other various aerodynamic surfaces. This involves a great expense in placing the sensors inside the aircraft with a plethora of wires or air tubes running throughout the aircraft.

One solution that has attempted to increase the number of sensors point available on the structure has been to utilize Micro Electrical Mechanical Devices (MEMS). MEMS offer the integration of micro-machined mechanical devices and microelectronics on a single chip. These electromechanical devices may include discrete sensors to measure conditions such as pressure, vibration, temperature, sound and the like. To put these devices on or in a structural model inside an environmental chamber such as a wind tunnel model could be an advantage. The MEMS devices may include multiple sensors in one package to monitor conditions simultaneously. However, the plethora of wiring is still required to both power the MEMS and transfer the data gathered by the MEMS. Therefore no significant practical or cost savings can be achieved by the use of these devices unless there is supplied power from internal sources such as batteries or battery assisted circuits. The current remote sensors for Prognostics or Identification RF transmission requires battery assisted power source in order to transmit data because insufficient power is harvested through the current technology and design. Thus these devices have a limited lifetime determined by their battery life.

SUMMARY OF THE INVENTION

Embodiments of the present invention provide a system and method for powering circuits that substantially eliminates or reduces disadvantages and problems associated with previously developed systems and methods. These embodiments specifically address the need for an improved MEMS module which requires no external electrical connections. This allows for an improved system of gathering physical environmental data from a structure to be tested with remote sensors requiring no electrical connections. Moreover, these embodiments specifically address the need for an improved system of gathering physical environmental data from a structure to be tested with MEMS sensor modules which require no external electrical connections.

The embodiments of the present invention provide a method of harvesting vibrational energy. This method involves generating a high magnetic flux density field within a current induction conductor such as an induction coil. The high magnetic flux density field is generated between two same pole magnets. The high magnetic flux density field may be displaced relative to the current induction conductor with vibrational energy. These displacements then cause the current induction conductor to be energized. The two same pole magnets are mounted between piezoelectric transducer (PZT) materials. These PZT materials generate an electric potential when the PZT materials are subject to the mechanical stresses of the vibrational energy. The electrical energy translated from the vibrational energy through both the energized current induction conductor and stress PZT materials may then be used to power a power circuitry or be stored for later use.

Another embodiment of the present invention provides a micro-electro mechanical system (MEMS) device. This MEMS device harvests vibrational energy. The MEMS device translates the vibrational energy into electrical energy with both an energized current induction conductor and stressed PZT materials. This electrical energy may then be used to power circuitry or be stored for later use.

MEMS devices provided by embodiments of the present invention have many uses. Such devices may be used as remote sensors or RF ID tags that do not require wired connections. These devices may be placed on or embedded within an object either permanently or temporarily.

Another embodiment provides an energy harvesting system that translates vibrational energy into electrical energy with both an application of Faraday's law and a PZT technique. This involves energizing a current induction conductor and stressing PZT materials with the vibrational energy respectively. This electrical energy may then be used to power circuitry or be stored for later use. These embodiments allow increased functionality of the wireless devices as the amount of power harvested is increased when compared to prior designs.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the figures like numerals being used to refer to like and corresponding parts of the various drawings.

Current wireless remote sensors for modeling, prognostics, diagnostics or identification require battery assisted power sources in order to wirelessly transmit data because insufficient power is harvested through existing designs. Embodiments of the present invention combine Piezoelectric (PZT) technique and Faraday's law in electric generation by crossing high dense magnetic flux through the coil to generate sufficient charges for storage and operation need. By coupling two form magnets, or electromagnets, with the same pole (N) or (S), with a thin non-conductive layer a high magnetic flux density field can be generated. These magnets may be held in place with a mechanical mount made from PZT materials. Thus vibrational energy applied to the PZT materials and magnets can be translated into electrical energy through Piezoelectric (PZT) technique and Faraday's law respectively. This results in an increase in the energy translated when compared to using either technique alone.

The building of complex structures such as aircraft, buildings or ships creates a need to both model and monitor physical conditions on the structure. This enables an understanding of the expected performance or design flaws of the structure prior to actually building the structure itself. Often this is accomplished using scale models of the structure in environmental chambers such as wind tunnels or wave tanks. In these chambers environmental conditions can be controlled allowing an exact determination of the environmental effects on the structure. Physical data is often measured with various transducers placed on the structure. The data can then be recorded and analyzed.

Figure 1:
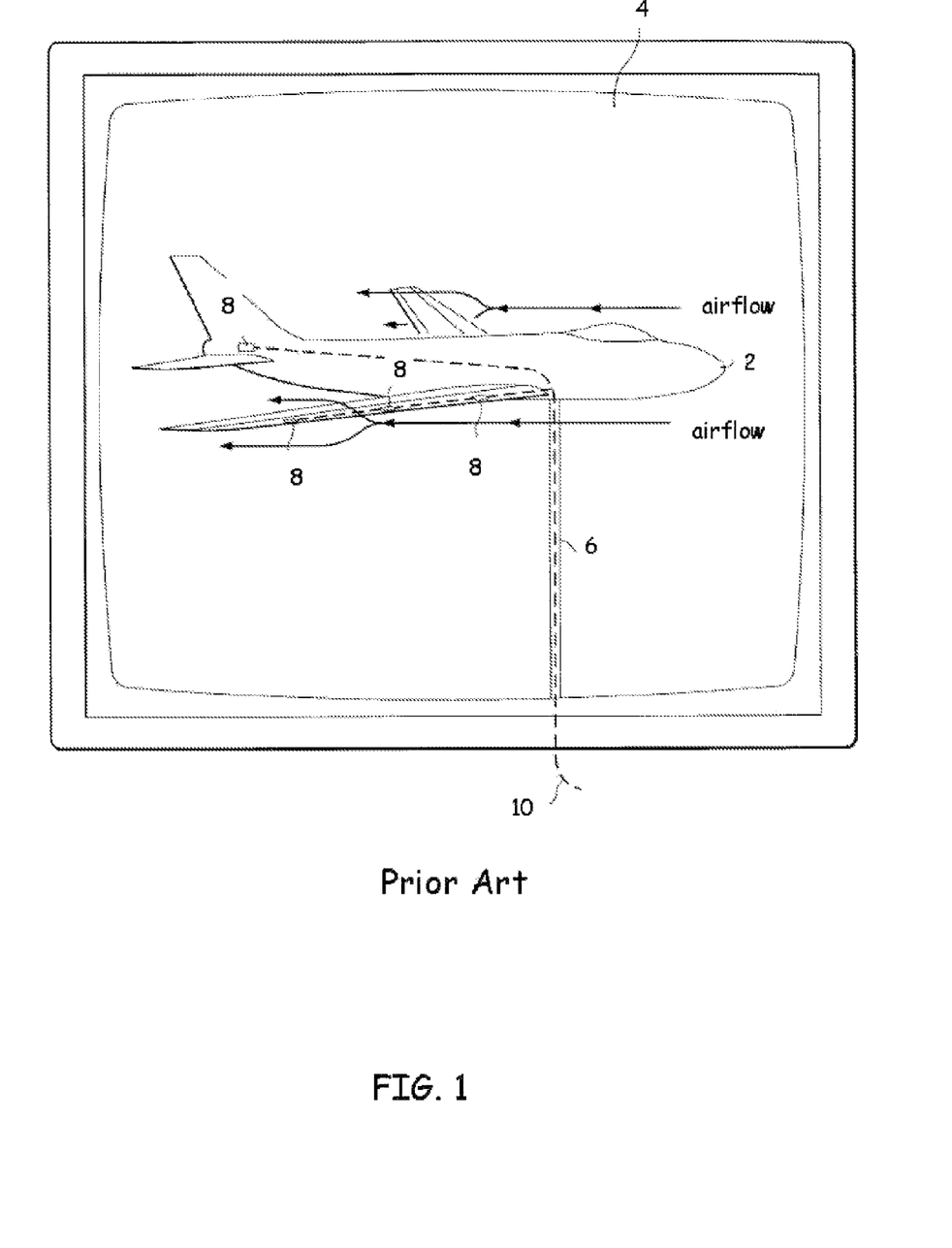
FIG. 1 illustrates how system physical data can be gathered from a structure under test.

FIG. 1 illustrates how system physical data can he gathered from a structure under test wherein the structure 2 under test (shown as a scale model of an aircraft) is placed inside an environmental test chamber 4 such as a wind tunnel. The structure under test may be mounted on a stand 6 and will be covered with a number of transducers 8 to monitor physical conditions such as the pressure of the air on various places on the surfaces of the structure 2 under test (such as a wind tunnel model). The transducers or sensors may be located on the wings, tails, structure and so forth of structure 2 under test. Transducers 8 are typically installed by drilling holes and passages in the structure 2 for wires 10 that run to the transducers 8 located in or on the structure 2. Placing transducers 8 on the structure 2 in this manner makes the structure 2 very expensive to build and limited in the number, location and position of transducers. Another solution (not shown) is to drill passages in the structure 2 that allow pressure to be sensed by remotely located transducers. This solution is also both expensive and limited. Furthermore, it is extremely difficult to apply either method to a full scale structure. Instrumenting a real aircraft to measure pressure, for example, on the leading edges, and various other aerodynamic surfaces is a very expensive and difficult process. Therefore the amount of data available also becomes limited.

Figure 2:
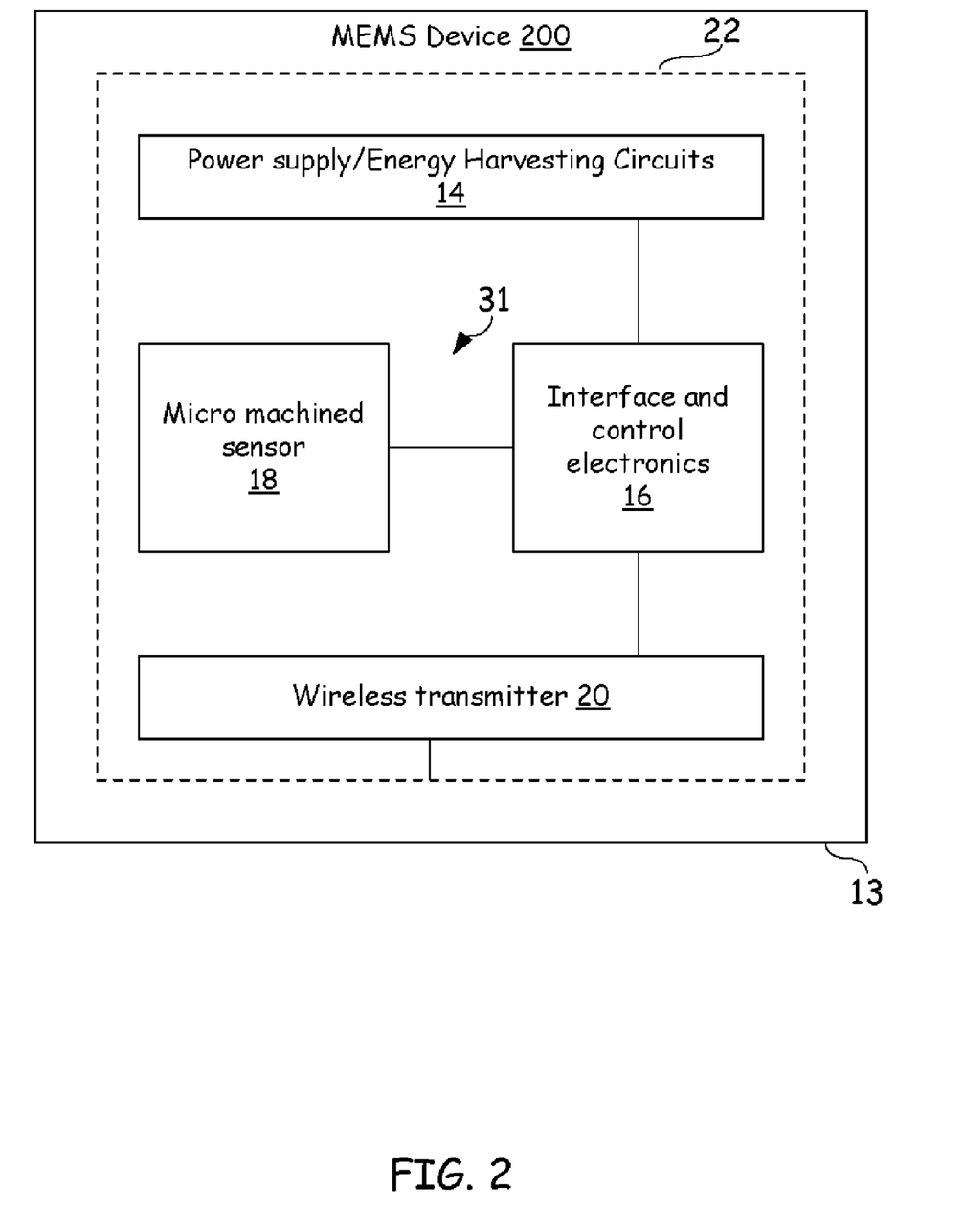
FIG. 2 illustrates a micro-electro mechanical device (MEMS) in accordance with an embodiment of the present invention.
Figure 3A:
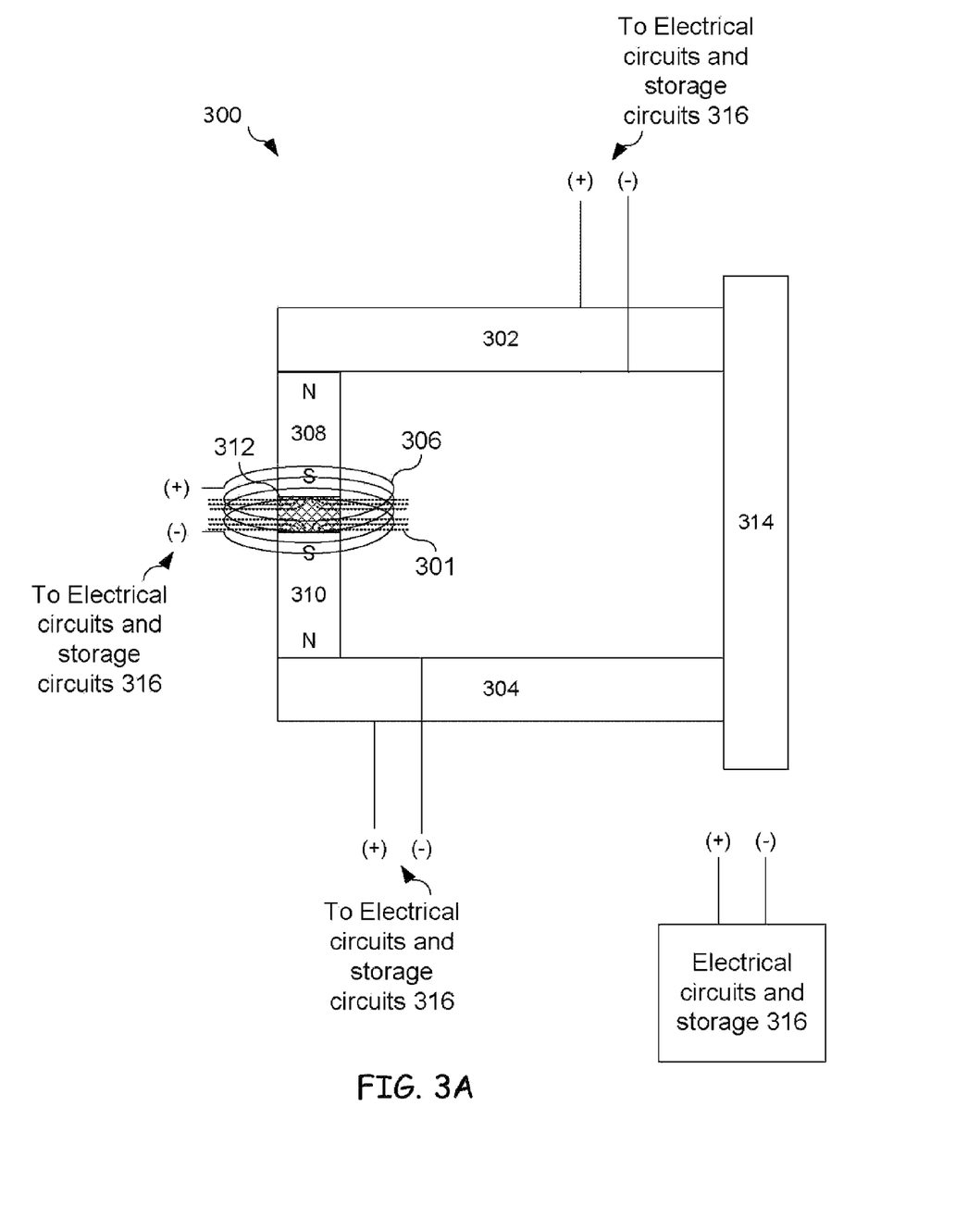
FIGS. 3A and 3B depict power source(s) in accordance with embodiments of the present invention that utilize both the PZT technique and Faraday's law to harvest vibrational energies.
Figure 3B:
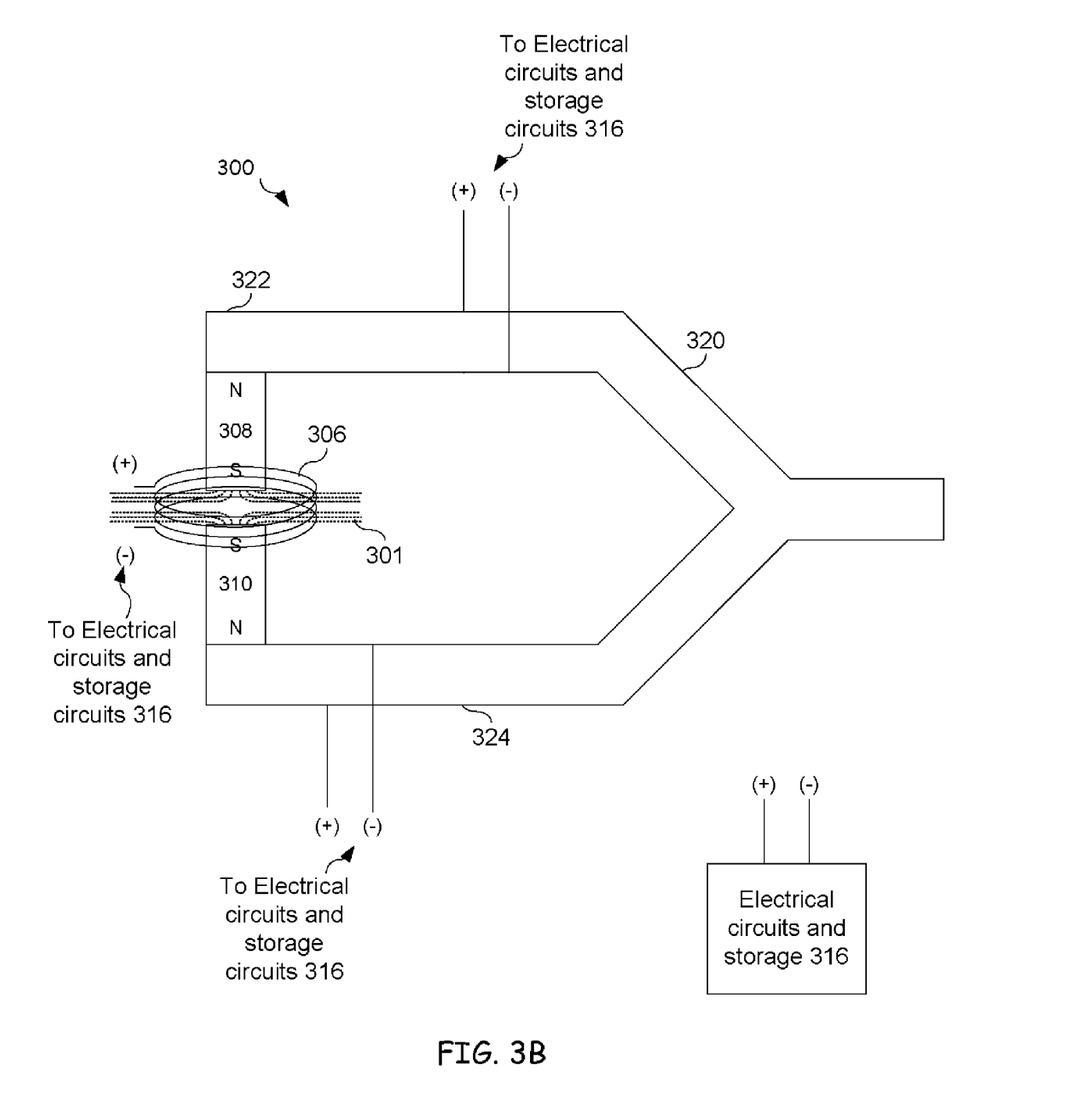
Figure 4:
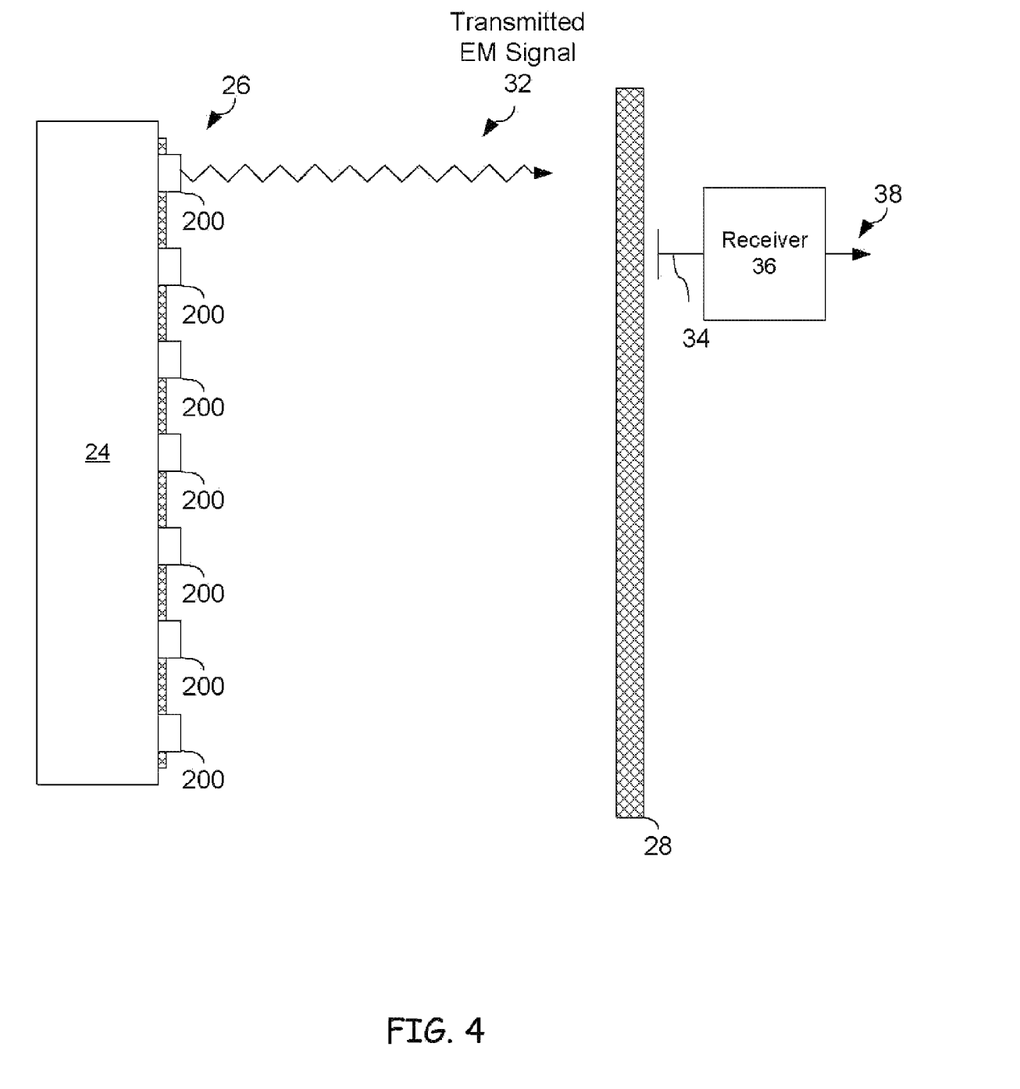
FIG. 4 illustrates one embodiment of a monitoring system used to monitor physical parameters at a structure in accordance with embodiments of the present invention.

FIG. 2 illustrates a micro-electro mechanical device (MEMS) 200. MEMS module 200 is formed on substrate 13 which may be silicon but is not be limited to silicon. On the substrate 13 will be an internal power supply 14 which will provide an electrical potential to power the elements of the MEMS module 200. The power supply 14 may be formed on or connected to the substrate 13. The power supply 14 is electrically connected to a series of integrated circuits 16 which are solid state electronic circuits formed on the substrate 13 by the processes commonly used in semiconductor manufacture, as known by those skilled in the art of semiconductor manufacture. These circuits 16 control the individual components on the substrate and the interface between such components. A micro mechanical transducer 18, formed on the substrate 13, operably connected to the integrated circuits 16, can monitor physical parameters such as pressure, sound, temperature, vibration, inertia or acceleration of the MEMS module 200. Transducer 18 may also be formed by processes commonly used in manufacture of semiconductors as known by those skilled in the art. The data gathered by the transducer 18 will be read by the integrated circuits 16 on the MEMS module 200 creating an electric signal 31. A transmitter 20 located on substrate 13 will be electronically connected to the integrated circuits 16 to provide a method of transmitting an electromagnetic signal 32, as shown in FIGS. 3 and 4. Electromagnetic signal 32 is representative of the physical parameters monitored by transducers 18 on the MEMS module 200. Transmitter 20 utilizes antenna 22, formed on substrate 13 to transmit the electromagnetic signal 32.

Interface and control electronics 16 may include a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Power supply 14 may be circuitry and mechanical devices used to harvest vibrational energy to which the MEMS device is exposed. FIGS. 3A and 3B depict power source(s) in accordance with embodiments of the present invention that utilize both the PZT technique and Faraday's law to harvest vibrational energies. FIG. 3A depicts power source 300 within power supply 14. Power source 300 in accordance with embodiments of the present invention may utilize both the PZT technique and Faraday's law. Faraday's law may be implemented by generating a high magnetic flux density field 301 within current induction conductor 306. The high magnetic flux density field may be generated by coupling two same pole magnets 308 and 310 with a thin non-conductive layer 312. This may effectively double the flux density seen at the current induction conductor 306. This phenomenon is well-known and allows for the creation of a very high magnetic flux density field. Magnetic field 301 created by magnets 308 and 310 may oscillate relative to the current induction conductor 306. The motion of the magnetic field relative to the current induction conductor or coil 306 induces a current that generates a magnetic field to oppose the changing magnetic field in the coil. When vibrational energy is applied to magnets 308 and 310, coil 306 generates an elector motive force in accordance with Faraday's principle. These magnets may be form magnets, permanent magnets, electromagnets or a combination thereof.

In FIG. 3B magnets 308 and 310 are mounted on a tuning fork-like device and are not coupled by nonconductive layer 312. Tuning fork 320 allows arms 322 and 324 to vibrate freely. This allows additional mechanical stress to be realized in arms 322 and 324 whereby increased mechanical stresses will result in increased vibrational energies that are harvested using the PZT effect. Additionally because the movement of magnets 308 and 310 are not dampened by material that physically couples the magnets, increased vibrations will result in increased changes in magnetic flux seen by the conductive coil. This will result in an increase in the amount of vibrational energy translated into electrical energy. In one embodiment, this tuning Fork design may have two separate and distinct vibration frequencies. This results from having unbalanced arms 322 and 324 to best capture desired vibration frequencies for total Coil and PZT energy harvesting.

In addition to generating and harvesting vibrational energy using Faraday's law, power source 300 may also harvest energy using the PZT affect. By placing PZT materials under a mechanical stress, a potential is generated across the PZT material. The potential may be proportional to the mechanical stress applied to the object or PZT material. This allows energy to be converted between mechanical and electrical forms. Specifically when a pressure or stress such as that imposed by vibrational energies acting on PZT materials 302 and 304 an electrical charge or potential is generated which may be harvested, stored, and/or utilized by circuitry 316. Circuitry 316 electrically couples to the circuitry of MEMS device 200 of FIG. 2. Energy harvested from energized current induction conductor 306 and the mechanically stressed PZT materials may be stored within a capacitor or battery for later use by the MEMS device. Other embodiments may use harvested electrical energy to power integrated circuits or an array of such devices to power larger circuits and devices.

Returning to FIG. 2, integrated circuits 16 may include a memory location (not shown) may be available for encoding a unique identification code to each particular MEMS module. This unique identification code will in turn be transmitted with the signal representing physical parameters monitored by the transducers 18 on the MEMS module. The memory location (not shown) incorporated into the integrated circuits 16 may provide a unique identification code for each particular MEMS module and wherein the transducers 18 may monitor at least one of the following physical parameters vibrations, pressure, temperature, sound, inertia or acceleration of the MEMS modules. Alternatively, this RF ID may allow the MEMS device to act as an RF ID tag for the life of the object to which it is attached without the need for a wired connection. This may greatly enhance inventory and material history management.

FIG. 4 illustrates one embodiment of a monitoring system 400 used to monitor physical parameters at a structure. The monitoring system 400 includes a series of MEMS modules 200 that can be incorporated to form an array 26 of MEMS modules 200 placed upon the structure 24. The structure 24 may be isolated from the monitoring equipment by a protective structure 28. This boundary may be the exterior wall of a wind tunnel or an environmental chamber. Furthermore, this boundary may serve to isolate and protect the monitoring equipment from the physical conditions to which the structure 24 has been exposed. External to the protective structure 28 from the structure 24, when exposed to vibrational energies, power supply 14 of the MEMS module 200 will generate an electric potential, allowing the integrated circuits 16 to read physical parameters at the location of the MEMS module on the structure. In turn, this information will be transmitted via an electromagnetic signal 32. A receiving antenna 34 may be placed at the boundary to gather the electromagnetic signal 32. A receiver 36 will be electrically connected to the receiving antenna 34 in order to receive and amplify the electromagnetic signal 32. A processor (not shown) may be connected to receive the output signal 38 of the receiver 36. This processor will process the output signal 38 in order to obtain data representative of the physical parameters at the MEMS module on the structure under test 24.

Figure 5:
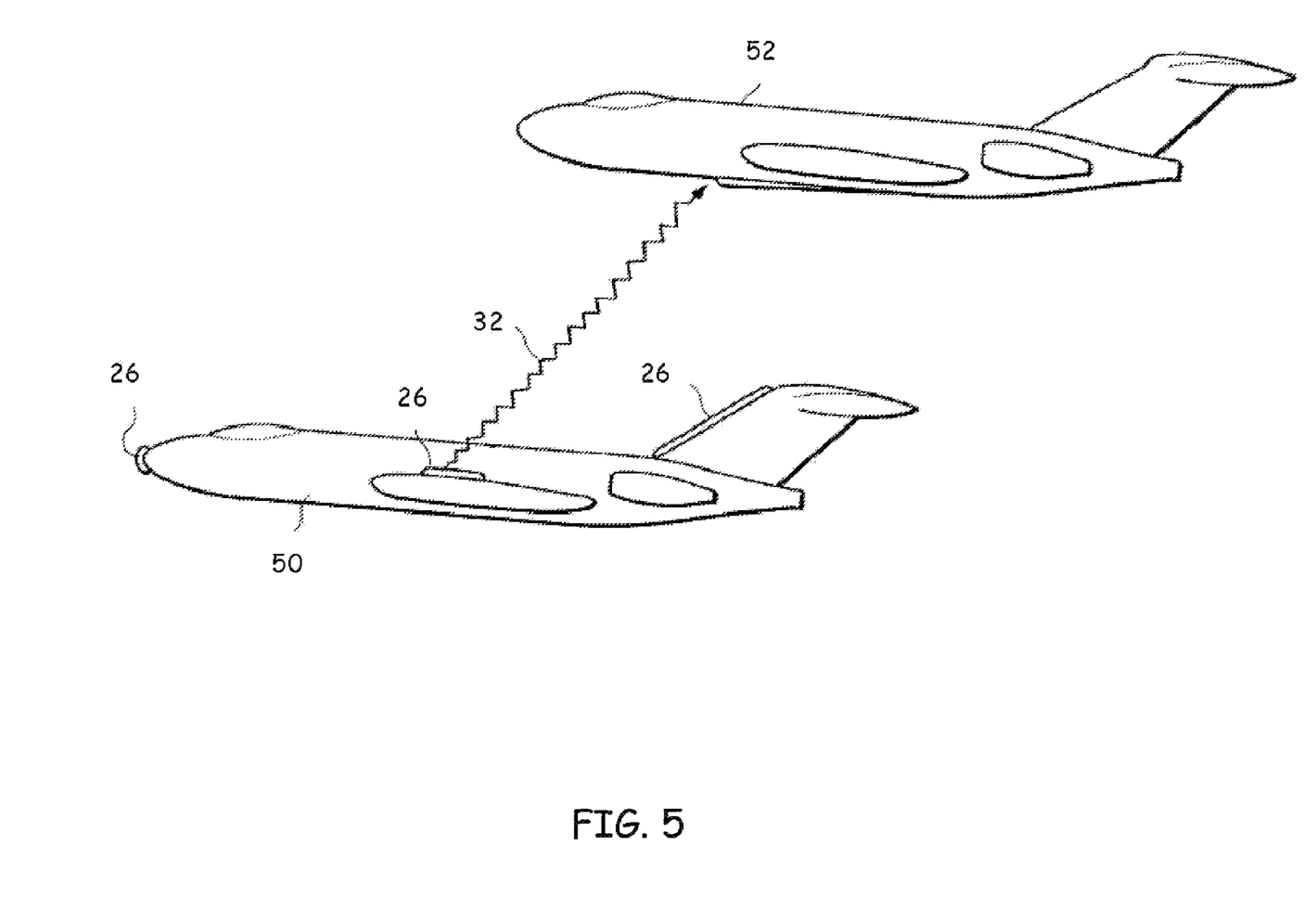
FIG. 5 presents an application of an embodiment of the present invention where the MEMS modules are placed on or embedded within a structure.

FIG. 5 presents a use of embodiments of the present invention where the MEMS modules 200 are placed on the exterior structure of an aircraft 50. These MEMS modules are monitored by a second aircraft 52. The MEMS modules 200 generate an electromagnetic signal 32 representative of physical conditions at the test aircraft 50. This electromagnetic signal is transmitted to a receiving antenna 34 shown in FIG. 4 located within aircraft 52 shown in FIG. 5. The electromagnetic signal is then processed as discussed in the description of FIG. 6.

MEMS modules 200 can be designed to transmit only after receipt of a transmission request. This ensures that only one MEMS module 200 of array 26 will transmit at any point in time. In another embodiment, the MEMS modules 200 are encoded with a unique identification code for each individual MEMS module 200. The electromagnetic signal 32 representative of the physical parameter at the structure under test 24 also contains this unique identification code. This method serves to uniquely identify the individual transmitting MEMS module 200 allowing a user who recorded the individual position of MEMS modules 200 to quickly identify the location of the monitored physical and improve the value of the gathered data.

Embodiments of the present invention may incorporate both power supply 14 of the MEMS module 200 and the unique identification code of the MEMS module 200 to further eliminate confusion at the receiver 36 and processor (not shown) to enable the user to identify the transmitting MEMS module 200.

The present invention also allows the user to place an array 26 of MEMS modules 200 on a structure under test 24 when the structure is not isolated in an environmental isolation chamber. The MEMS array 26 can be placed on or embedded within an actual aircraft or other structure in order to monitor physical parameters from various points on the structure.

Figure 6:
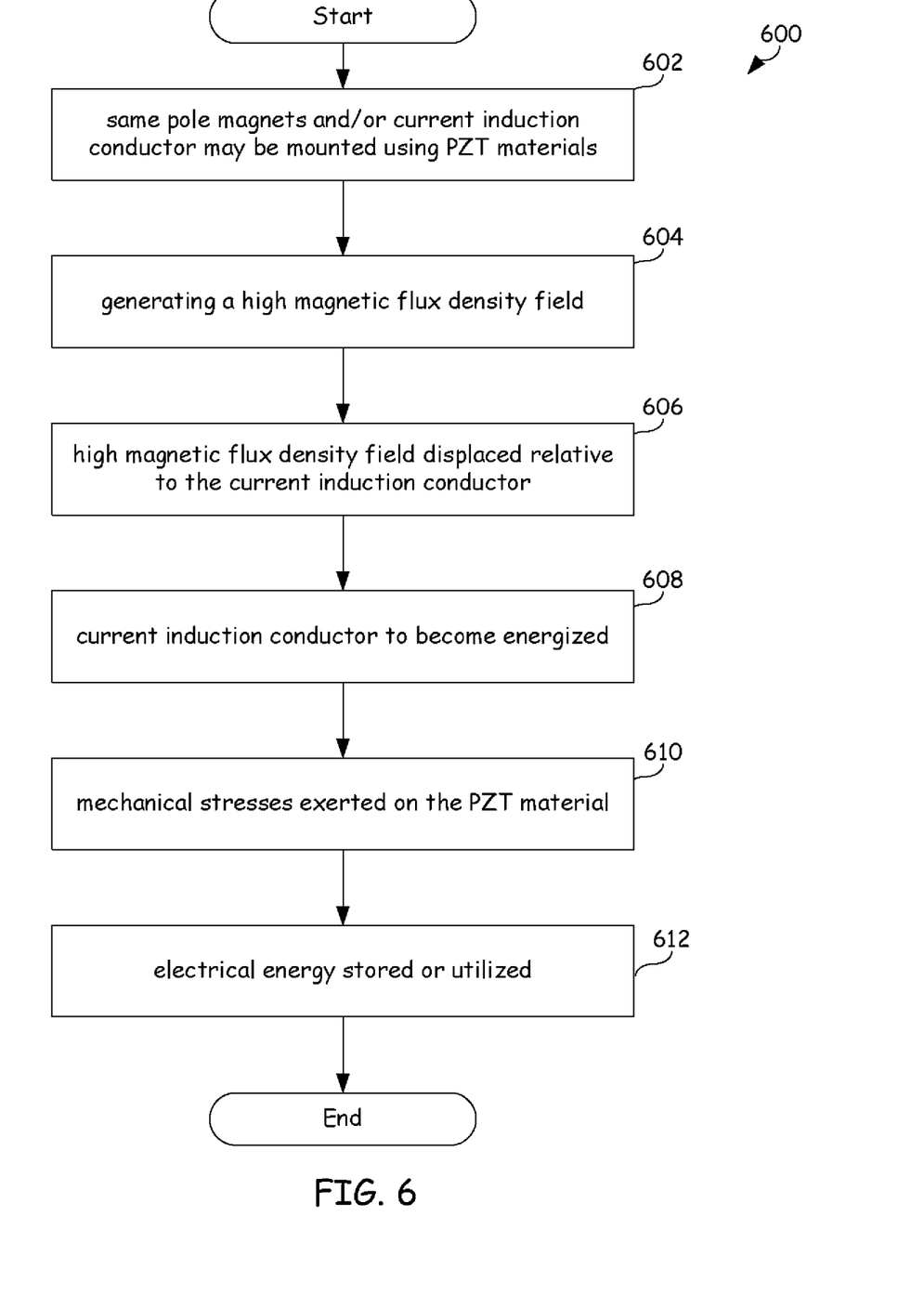
FIG. 6 provides a logic flow diagram illustrating a method of harvesting vibrational energy in accordance with embodiments of the present invention.

FIG. 6 provides a logic flow diagram illustrating a method of harvesting vibrational energy in accordance with embodiments of the present invention. Operations 600 begin in step 602 by mounting magnets using PZT materials. This allows embodiments of the present invention combine a PZT technique and Faraday's Law principle to uniquely harvest energy. One embodiment provides a tuning Fork design which may have two separate distinct vibration frequencies. This results from having unbalanced arms to best capture desired vibration frequencies for total Coil and PZT energy harvesting. In another embodiment these PZT arms may be joined by a non conducting material. This high magnetic flux density field is generated in step 604 between two same pole magnets as discussed with reference to FIGS. 3A and 3B. Additionally, this field intersects a current induction conductor such is a coil. The high magnetic flux density field is displaced relative to the current induction conductor when the two same pole magnets or current induction conductor are exposed to vibrational energy in step 606. This vibrational energy causes the current induction conductor to become energized in step 608. The vibrational energy that causes relative motion between the high magnetic flux density field and the current induction conductor cause mechanical stresses to be exerted on the PZT materials in step 610. This mechanical stress causes an electric potential across the PZT materials to be generated. In step 612 the electrical energy generated by the displacement of the high magnetic flux density field relative to the current induction conductor and the exposure of the PZT materials to mechanical stresses translates the vibrational energy into electrical energy, which may be stored or utilized in step 612. This method may be used within a MEMS type device allowing a MEMS device such as a sensor or radio frequency (RF) identification (ID) tag to be placed on or embedded within an object. This allows for improved tracking of material as structures are assembled, prognostic and diagnostic analysis to be performed on existing structures, and the tracking of environmental conditions or other sensed conditions at the object over the object's lifetime without the need for numerous embedded wires.

In summary, embodiments of the present invention provide a method of harvesting vibrational energy. This method involves generating a high magnetic flux density field within a current induction conductor such as an induction coil. The high magnetic flux density field is generated between two same pole magnets. The high magnetic flux density field may be displaced relative to the current induction conductor with vibrational energy. These displacements then cause the current induction conductor to be energized. The two same pole magnets are mounted between piezoelectric transducer (PZT) materials. These PZT materials generate an electric potential when the PZT materials are subject to the mechanical stresses of the vibrational energy. The electrical energy translated from the vibrational energy through both the energized current induction conductor and stress PZT materials may then be used to power a power circuitry or be stored for later use.

Embodiments of the present invention combine a PZT technique and Faraday's Law principle to uniquely integrate inverting magnetic polarity to create maximum magnetic flux across a coil or conductor in order to harvest energy. One embodiment provides a tuning Fork design which may have two separate distinct vibration frequencies. This results from having unbalanced arms to best capture desired vibration frequencies for total Coil and PZT energy harvesting. Such energy harvesting devices may have many applications such as, hut not limited to, portable/remote computing and electronic devices.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method of harvesting vibrational energy comprising:
   generating a high magnetic flux density field within a current induction conductor, wherein the high magnetic flux density field is generated between two same pole magnets;
   displacing the high magnetic flux density field relative to the current induction conductor with vibrational energy;
   energizing the current induction conductor with displacements of the high magnetic flux density field relative to the current induction conductor;
   mechanically mounting the two same pole magnets between piezoelectric transducer (PZT) materials;
   generating a electrical potential across the PZT materials when the PZT materials are subject to the vibrational energy; and
   storing electrical energy translated from the vibrational energy through both the energized current induction conductor and mechanically stressed PZT materials.

2. The method of claim 1, further comprising powering a Micro Electro-Mechanical Systems (MEMS) device from the stored electrical energy.

3. The method of claim 1, wherein the MEMS device comprises a sensor.

4. The method of claim 1, wherein the MEMS device comprises a radio frequency (RF) identifier (ID) tag.

5. The method of claim 1, wherein the MEMS device is embedded within a manufactured object.

6. The method of claim 5, wherein the MEMS device comprises:
   an radio frequency (RF) identifier (ID) tag; and
   a micro-mechanical transducer operable to monitor environmental conditions at the object; and
   a wireless transmitter operable to transmit data on the environmental conditions at the object.

7. The method of claim 6, wherein environmental conditions at the object comprise at least one of a group of characteristics consisting of temperature, pressure, vibrations, sound, and acceleration acting on the MEMS device.

8. A Micro Electro-Mechanical Systems (MEMS) device, comprising:
   a first harvesting system operable to store vibrational energy as electrical energy, the first harvesting system comprising:
      a high magnetic flux density field generated within a current induction conductor, wherein the high magnetic flux density field is generated between two same pole magnets;
      a mechanical mount wherein vibrational energy displaces the high magnetic flux density field relative to the current induction conductor to energize the current induction conductor;
   a second harvesting system operable to store vibrational energy as electrical energy, the second harvesting system comprising:
      piezoelectric transducer (PZT) materials operable to generate a electrical potential across the PZT materials when the PZT materials are mechanically stressed by the vibrational energy, wherein the mechanical mount is made from the PZT materials; and a storage device coupled to the current induction conductor and PZT materials wherein the storage device is operable to store electrical energy from the energized current induction conductor and the stressed PZT materials.

9. The MEMS device of claim 8, wherein the MEMS device is powered from the stored electrical energy.

10. The MEMS device of claim 8, wherein the MEMS device comprises a sensor.

11. The MEMS device of claim 8, wherein the MEMS device comprises a radio frequency (RF) identifier (ID) tag.

12. The MEMS device of claim 8, wherein the MEMS device is embedded within a manufactured object.

13. The MEMS device of claim 8, wherein the MEMS device further comprises:
   an radio frequency (RF) identifier (ID) tag; and
   a micro-mechanical transducer operable to monitor environmental conditions at the object; and
   a wireless transmitter operable to transmit data on the environmental conditions at the object.

14. The MEMS device of claim 13, wherein environmental conditions at the object comprise at least one of a group of characteristics consisting of temperature, pressure, vibrations, sound, and acceleration acting on the MEMS device.

15. A power harvesting device operable to translate vibrational energy into electrical energy, the power harvesting device comprising:
   a first harvesting system operable to store vibrational energy as electrical energy, the first harvesting system comprising:
      a high magnetic flux density field generated within a current induction conductor, wherein the high magnetic flux density field is generated between two same pole magnets;
      a mechanical mount wherein vibrational energy displaces the high magnetic flux density field relative to the current induction conductor to energize the current induction conductor; and
   a second harvesting system operable to store vibrational energy as electrical energy, the second harvesting system comprising:
      piezoelectric transducer (PZT) materials operable to generate a electrical potential across the PZT materials when the PZT materials are mechanically stressed by the vibrational energy, wherein the mechanical mount is made from the PZT materials; and
      circuitry energized by the energized current induction conductor and mechanically stressed PZT materials.

16. The power harvesting device of claim 15, further comprising a storage device coupled to the current induction conductor and PZT materials wherein the storage device is operable to store electrical energy from the energized current induction conductor and the stressed PZT materials.

17. The power harvesting device of claim 15, wherein the power harvesting device powers a wireless sensor system.

18. The power harvesting device of claim 15, wherein the power harvesting device powers a radio frequency (RF) identifier (ID) tag.

19. The power harvesting device of claim 15, wherein the power harvesting device powers is embedded within a manufactured object.

20. The power harvesting device of claim 15, wherein the power harvesting device powers a MEMS device.

21. The power harvesting device of claim 20, wherein the MEMS device further comprises:
   an radio frequency (RF) identifier (ID) tag; and
   a micro-mechanical transducer operable to monitor environmental conditions at the object; and
   a wireless transmitter operable to transmit data on the environmental conditions at the object.

22. The power harvesting device of claim 21, wherein environmental conditions at the object comprise at least one of a group of characteristics consisting of temperature, pressure, vibrations, sound, and acceleration acting on the MEMS device.

23. The power harvesting device of claim 15, wherein the mechanical mount comprises a tuning fork design.

* * * * *